United States Patent [19]

Chang

[11] Patent Number: 4,974,630
[45] Date of Patent: Dec. 4, 1990

[54] GAS PRESSURE REGULATOR HAVING SIDE-DRAFTED THROTTLING MEANS

[76] Inventor: Zong-Shi Chang, P.O. Box 10160, Taipei, Taiwan

[21] Appl. No.: 384,542

[22] Filed: Jul. 24, 1989

[51] Int. Cl.⁵ .................... F16K 17/24; G05D 16/06
[52] U.S. Cl. .................... 137/460; 137/505.46
[58] Field of Search .............. 137/458, 460, 505.39, 137/505.46

[56] References Cited

U.S. PATENT DOCUMENTS

| | | | |
|---|---|---|---|
| 4,067,355 | 1/1978 | St. Clair | 137/458 |
| 4,195,656 | 4/1980 | Kanerva et al. | 137/458 |
| 4,257,448 | 3/1981 | Shiu et al. | 137/460 |
| 4,373,548 | 2/1983 | Chou | 137/460 |
| 4,817,664 | 4/1989 | Chang | 137/456 |

FOREIGN PATENT DOCUMENTS 577674  9/1924  France .................... 137/505.39

Primary Examiner—Stephen M. Hepperle

[57] ABSTRACT

A gas pressure regulator includes a throttle valve provided between a gas inlet passage and a pressure sensing chamber pertaining to a gas exit passage, the throttle valve having a sealing plug comprised of a needle and a base float fluidically drafted for closing a truncated cone hole of the throttle valve when subject to a surge gas flow of great volume rate due to a gas leakage from a downstream gas line for safety reason, and upon a simple restoring of the plug for re-opening the throttle valve, a gas stream can be continuously supplied when just opening a valve of a gas source.

1 Claim, 2 Drawing Sheets

GAS PRESSURE REGULATOR HAVING SIDE-DRAFTED THROTTLING MEANS

BACKGROUND OF THE INVENTION

Even U.S. Pat. No. 4,817,664 issued to the same applicant, Z. S. Chang of this application and U.S. Pat. No. 4,195,656 issued Kanerva's et al., all disclosed a pressure regulator for automatically shutting off a throttle nozzle of the regulator in case of excess gas flow or a gas leakage caused in a gas line, such a conventional gas regulator should require a small tensioning spring (numeral "263" of Chang's patent or "106" of Kanerva's patent) for normally urging a valve reciprocatively held in an orifice of the throttle nozzle, thereby increasing the adjustment problems for adjusting a pressure in a gas reduced chamber. Especially after a time period of practical use, the springs may have fatigve failure to further increase the difficulty for adjusting the pressure in the gas reduced chamber, thereby influencing its operation and maintenance.

The present inventor has found the drawbacks of the conventional gas regulator having spring-loaded throttle nozzle and invented the present gas pressure regulator.

SUMMARY OF THE INVENTION

The object of the present invention is to provide a gas pressure regulator including a throttle valve provided between a gas inlet passage and a gas exit passage, the throttle valve having a sealing plug comprised of a needle and a float operatively sealing a throttle hole of the valve when subject to a gas leakage in a gas line.

DETAILED DESCRIPTION

Figure 1:
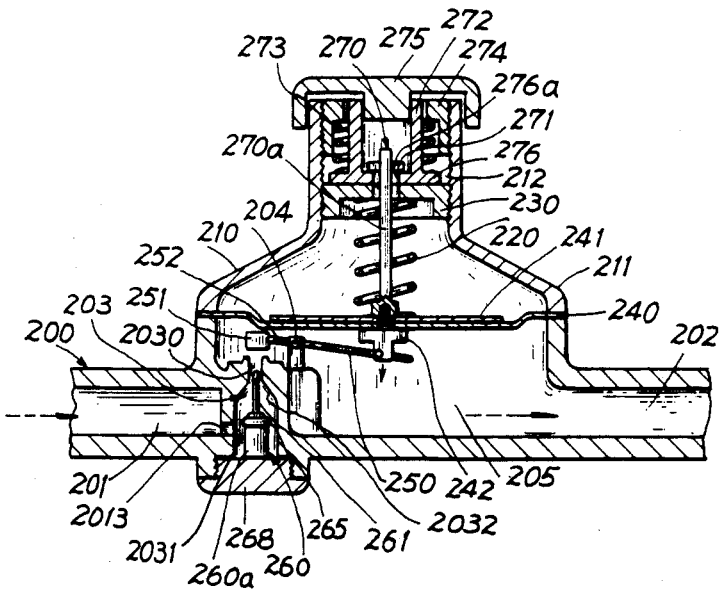
FIG. 1 is a sectional drawing of the present invention showing a plug of the throttle valve having no gas flow in the regulator.

As shown in the drawing figures, the present invention comprises: a main body 200, a cover 210, a compression spring 220, a spring holder 230, a diaphragm 240, a switch lever 250, a throttle valve 203, and a restoring mechanism 270.

The main body 200, the diaphragm 240 and restoring mechanism 270 of this invention is similar to the structure as disclosed in my previously filed U.S. Pat. No. 4,817,664, in which: the diaphragm 240 includes a connecting element 242 connected to a circular-metal plate 241 so as to strengthen the diaphragm 240. The connecting element 242 is connected to one end of the switch lever 250, and the other end 252 is fitted with a sealing member 251. The connecting element 242 is screwed to a rod 270a of restoring mechanism 270.

The restoring mechanism 270 comprises a rod 270a, a sleeve 272, a spring 273, a spring holder 274, a top cover 275 and a retaining element 271. The sleeve 272 is formed a large-diameter disk 276 on its lower end which is formed with a rod hole 276a for reciprocatively moving the rod 270a. The hole 276a is smaller than a lateral length of the retaining element 271. On assembly the sleeve 272 is inserted through a threaded hole 212 in the top cover of the body 200 for upwardly pulling the retaining element 271 which is fastened to the tip of the rod and operatively carried by the disk 276. When the sleeve 272 rises because of external force, the rod will also rise but when the sleeve drops, the rod will not be affected. The spring 273 is inserted around the sleeve 272 and the spring holder 274 is screwed into the top cover of the body 200 through the threaded hole 212. The lower end of the spring 273 bears against the top of the large diameter disk 276 formed on a lower end of the sleeve 272 and the upper end of the spring 273 bears against a protruding part of the spring holder 274. The top cover 275 is connected to the sleeve 272. When the top cover 275 is pulled, the sleeve 272 acts on the retaining element 271 on the rod to cause the rod 270a to rise to a limit set by the spring holder 274.

The switch lever 250 is pivotally mounted on a pivot axle 204 formed on a valve body 203a of the throttle valve 203. The throttle valve 203 is defined between a gas inlet passage 201 and a pressure sensing chamber 205 adjacent to a gas exit passage 202.

The throttle valve 203 of the present invention includes: a valve body 203a generally cylindrical shaped, a throttle seat 203b formed on a top portion of an upper throttle hole 2030 operatively sealed by the sealing member 251 of the switch lever 250, a cylindrical bore 2031 formed in a lower portion of the valve body 203a, a truncated cone hole 2032 formed between the cylindrical bore 2031 and the upper throttle hole 2030, a bottom cap 268 encapped on a bottom portion of the main body 200 for sealing the cylindrical bore 2031, a side entrance hole 2013 formed in a side wall of the valve body 203a communicated with the cylindrical bore 2031 and the inlet passage 201, and a sealing plug 260 movably held inside the valve body 203a and operatively sealing the throttle valve 203 or restored to open the hole 2032 towards the bottom cap 268.

The upper throttle hole 2030 is smaller in diameter than the bore 2031. The bore 2031 is tapered upwardly to connect the upper hole 2030 through the truncated cone hole 2032.

The sealing plug 260 includes: a cylindrical float 260a having a diameter slightly smaller than that of the cylindrical bore 2031, a needle 261 protruding upwardly from the float 260a operatively defining an annular aperture between the needle 261 and the upper throat hole 2030 when the float is fluidically drafted upwardly, and a packing ring 265 disposed on a neck portion between the needle 261 and the float 260a. The plug 260 may be fluidically drafted towards the hole 2030 when the gas flows to urge the float 260a of the throttle valve 203 due to a thrust force caused by the gas stream through the cylindrical bore 2031 inside the valve body 203a and the pressure-sensing chamber 205, which chamber 205 is designed for normally reducing the gas pressure from the inlet passage 201 towards the exit passage 202. The sealing plug 260 has a longitudinal axis generally perpendicular to a longitudinal axis of the inlet passage 201.

In operating the present invention under a condition of no fluid flow as shown in FIG. 1, the gravity of the plug 260 will make it to drop to rest on the bottom cap 268 and the compression spring 220 biases the diaphragm 240 downwardly to lift the left sealing member 251 of the switch lever 250 upwardly.

The switch lever arrangement 250 coupling the diaphragm 240 to a sealing member 251 which can abut the end of the needle 261 projecting into the pressure sensing chamber 205 in accordance with the present invention.

Figure 2:
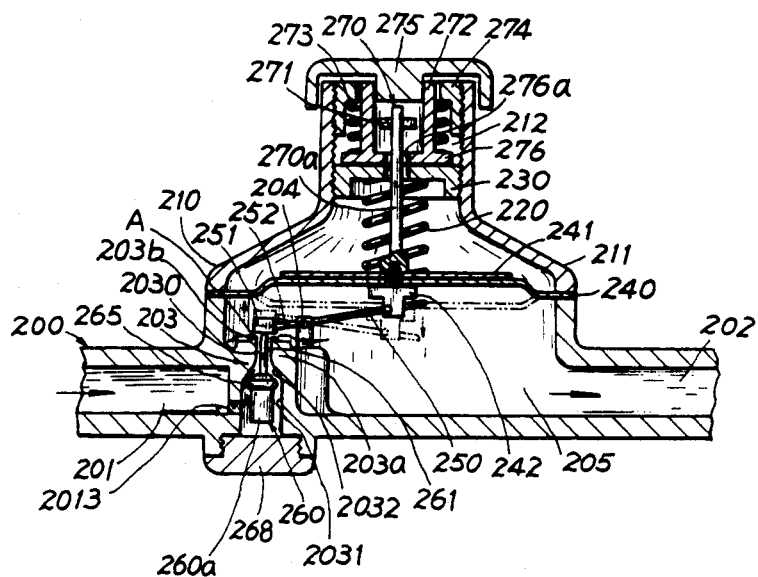
FIG. 2 shows a normal gas flow through the regulator in accordance with the present invention.

If the downstream gas is used to reduce the pressure in chamber 205, the spring 220 will bias the diaphragm 240 downwardly to lift the left sealing member 251, and the upwardly moving needle 261 will form an aperture A between the member 251 and the throttle seat 203b to flow the gas stream towards the exit passage 202 for normal gas supply use as shown in FIG. 2.

Figure 3:
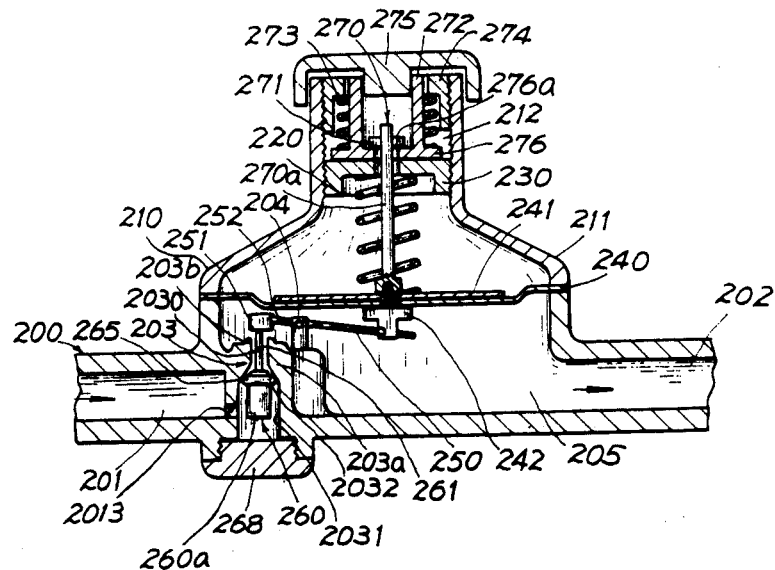
FIG. 3 is an illustration showing a closing throttle valve of the present invention when the gas line is subject to a gas leakage.

During the gas supply service, if there is a gas leakage caused in a broken gas line, a suddenly increased gas volume flowing through the hole 2013, bore 2031 and the throttle hole 2030 will develop a greater pressure drop across the valve 203 to increase the gas flow velocity to further draft the float 260a upwardly and the sealing member 251 is biased upwardly by a reduced pressure in chamber 205 without obstructing the upward movement of the needle 261 until the packing ring 265 on the plug 260 circumferentially seals the truncated cone hole 2032 as shown in FIG. 3. The throttle valve 203 is now closed to prevent a continuous gas flow towards a downstream broken area for safety purpose.

After the broken or damaged gas line is repaired, the plug 260 will be lowered by pulling the cover 275 upwardly to lower the member 251 to depress the needle 261 for opening the valve 203 and the gas regulator may be ready for next service for a normal gas supply use.

The present invention is superior to a conventional gas regulator by providing a throttle valve 203 having a sealing plug without being tensioned by a spring so as to overcome the adjustment problems of the regulators found in U.S. Pat. Nos. 4,817,664 and 4,195,656 since the springs 263, 106 of the two prior arts are now deleted.

Meanwhile, the specific structure of the sealing plug 260 including a needle 261 and a cylindrical float 260a may cause several advantages, such as: an easier carry for sealing the throttle valve by a fluid flow.

Nevertheless, in operating the present invention having the sealing plug free of spring load, it is very convenient to adjust the pressure in the pressure sensing chamber, without considering those factors or variables caused by the spring 263 such as taught by U.S. Pat. No. 4,817,664.

Naturally, according to the present invention a longitudinal axis of the cylindrical bore 2031 of the throttle valve 203 may be modified to be coaxial with an axis of the inlet passage 201 so that a gas stream flowing through the inlet passage 201, the side hole 2013 and the cylindrical bore 2031 may be generally linear to be different from a fluid mode as shown in FIG. 1.

I claim:
1. A gas pressure regulator comprising:
   a main body having a gas inlet passage, a gas exit passage, and a pressure sensing chamber containing a spring biased diaphragm, a throttle valve connecting the inlet passage to the pressure sensing chamber;
   a restoring mechanism including a rod coupled to said diaphragm; said throttle valve including a valve body formed between said inlet passage and said pressure-sensing chamber, and a sealing plug movably held inside the valve body for operatively sealing the throttle valve;
   and a switch lever arrangement coupling said diaphragm to a sealing member which can abut the end of said needle of said sealing plug projecting into said pressure sensing chamber,
   the improvement which comprises:
   said valve body of said throttle valve having a cylindrical bore formed in an outer portion of the valve body, a throttle hole tapered inwardly from said cylindrical bore forming a truncated cone hole between the throttle hole and the cylindrical bore, and an entrance hole formed in the valve body communicated with the cylindrical bore and communicated with the inlet passage; said sealing plug including a cylindrical float movably held in said cylindrical bore, a needle protruding inwardly from said float reciprocatively moving within said throttle hole, said truncated cone hole and said bore, and a packing ring formed between said needle and said float; an annular aperture defined between said needle of said sealing plug and said throttle hole, said float having a diameter larger than a diameter of said needle but slightly smaller than an inside diameter of the cylindrical bore, whereby upon a surge gas flow of increased volume through the gas regulator, the gas folowing through the throttle valve will exert a pressure drop and increase flow velocity to thereby draft the float inwardly to extend the needle of the sealing plug inwardly to allow the packing ring of the plug sealing the truncated cone hole for closing the throttle valve for safety purpose.

* * * * *